US006993460B2

(12) United States Patent
Beadle et al.

(10) Patent No.: US 6,993,460 B2
(45) Date of Patent: Jan. 31, 2006

(54) METHOD AND SYSTEM FOR TRACKING EIGENVALUES OF MATRIX PENCILS FOR SIGNAL ENUMERATION

(75) Inventors: Edward R. Beadle, Melbourne, FL (US); John F. Dishman, Palm Bay, FL (US); Richard H. Anderson, Melbourne, FL (US); Paul D. Anderson, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 3 days.

(21) Appl. No.: 10/739,022

(22) Filed: Dec. 19, 2003

(65) Prior Publication Data

US 2004/0204924 A1 Oct. 14, 2004

Related U.S. Application Data

(60) Provisional application No. 60/458,038, filed on Mar. 28, 2003.

(51) Int. Cl.
*H03F 1/26* (2006.01)
*H04B 15/00* (2006.01)

(52) U.S. Cl. ....................................... 702/196; 702/191

(58) Field of Classification Search .................. 702/57, 702/66, 70, 73, 74, 179, 189–191, 194–196, 702/199; 375/316; 455/67.11
See application file for complete search history.

(56) References Cited

U.S. PATENT DOCUMENTS

| | | | |
|---|---|---|---|
| 4,607,305 A | 8/1986 | Milo | |
| 4,965,732 A * | 10/1990 | Roy et al. | 342/147 |
| 5,283,813 A | 2/1994 | Shalvi et al. | |
| 5,459,668 A | 10/1995 | Dogan et al. | |
| 5,539,832 A | 7/1996 | Weinstein et al. | |
| 5,640,419 A | 6/1997 | Janusas | |
| 5,706,402 A | 1/1998 | Bell | |
| 5,848,160 A | 12/1998 | Cai et al. | |
| 5,909,646 A | 6/1999 | Deville | |
| 6,064,903 A * | 5/2000 | Riechers et al. | 600/407 |
| 6,185,309 B1 | 2/2001 | Attias | |
| 6,208,295 B1 | 3/2001 | Doğan et al. | |
| 6,252,962 B1 | 6/2001 | Sagey | |
| 6,426,977 B1 | 7/2002 | Lee et al. | |
| 6,449,560 B1 | 9/2002 | Kimball | |

(Continued)

OTHER PUBLICATIONS

Abed-Meraim, K., Y. Xiang, J.H. Manton, and Y. Hua, “Blind Source Separation Using Second-Order Cyclostationary Statistics,” IEEE Transactions on Signal Processing, vol. 49, No. 4, Apr. 2001, pp. 694-701.

(Continued)

*Primary Examiner*—Marc S. Hoff
*Assistant Examiner*—Manuel L. Barbee
(74) *Attorney, Agent, or Firm*—Duane Morris LLP

(57) ABSTRACT

Embodiments of a system and method are disclosed that exploit the unique higher order statistics of temporally dependent waveforms to detect and enumerate signals in a multi-signal and noise environment. The embodiments use spatial $4^{th}$-order cumulants or spatial $2^{nd}$-order moments in a Blind Source Separation operation and generalized eigenvalue decomposition to determine unique matrix pencil eigenvalues for a set of unknown signals. Sequential detection in the complex plane of the eigenvalues in associated tracks for successive blocks of sensor data serve as the basis of the detection decision. The embodiments may include a multi-element array and do not require a priori knowledge of the signal environment to detect and enumerate the signals.

36 Claims, 5 Drawing Sheets

U.S. PATENT DOCUMENTS

| | | | | |
|---|---|---|---|---|
| 6,535,666 | B1 | 3/2003 | Dogan et al. | |
| 6,784,831 | B1 * | 8/2004 | Wang et al. ........... | 342/357.12 |
| 2002/0153891 | A1 | 10/2002 | Smith et al. | |

OTHER PUBLICATIONS

Belouchrani, A., K. Abed-Meraim, J.F. Cardoso, and E. Moulines, "Blind Source Separation Using Second-Order Statistics," IEEE Transactions on Signal Processing, vol. 45, No. 2, Feb. 1997, pp. 434-444.

Biglieri, E., J. Proakis, and S. Shamai, "Fading Channels: Information-Theoretic and Communications Aspects," IEEE Transactions on Information Theory, vol. 44, No. 6, Oct. 1998, pp. 2619-2691.

Cardoso, J.F., "Blind Signal Separation: Statistical Principles," Proceedings of the IEEE, vol. 9, No. 10, Oct. 1998, pp. 2009-2025.

Cardoso, J.F. and B. Hvam Laheld, "Equivariance Adaptive Source Separation," IEEE Transactions on Signal Processing, vol. 44, No. 12, Dec. 1996, pp. 3017-3030.

Castedo, L. and A.R. Figueiras-Vidal, "An Adaptive Beamforming Technique Based on Cyclostationary Signal Properties," IEEE Transactions on Signal Processing, vol. 43, No. 7, Jul. 1995, pp. 1637-1650.

Chang, C., Z. Ding, S.F. Yau, and F.H.Y. Chan, "A Matrix-Pencil Approach to Blind Separation of Colored Non-Stationary Signals," IEEE Transactions on Signal Processing, vol. 48, No. 3, Mar. 2000, pp. 900-907.

Choi, S. and A. Cichocki, "Blind Separation of Non-stationary and Temporally Correlated Sources from Noisy Mixtures," Neural Networks for Signal Processing X, 2000. Proceedings of the 2000 IEEE Signal Processing Society Workshop, vol. 1, Dec. 2000, pp. 405-414.

Ding, Z. and T. Nguyen, "Stationary Points of Kurtosis Maximization Algorithm for Blind Signal Separation and Antenna Beamforming," IEEE Transactions on Signal Processing, vol. 48, No. 6, Jun. 2000, pp. 1587-1596.

Dogan, M.C. and J.M. Mendel, "Applications of Cumulants to Array Processing—Part I: Aperture Extension and Array Calibration," IEEE Transactions on Signal Processing, vol. 43, No. 5, May 1995, pp. 1200-1216.

Gabriel, W.F., "Adaptive Processing Array Systems," Proceedings of the IEEE, vol. 80, No. 1, Jan. 1992, pp. 152-162.

Godard, D.N., "Self-recovering Equalization and Carrier Tracking in Two-dimensional Data Communication Systems," IEEE Transactions on Communications, vol. COMM-28, Nov. 1980, pp. 1867-1875.

Kohno, R., "Spatial and Temporal Communication Theory Using Adaptive Antenna Array," IEEE Personal Communication, vol. 5, No. 1, Feb. 1998, pp. 28-35.

Krim, H. and M. Viberg, "Two Decades of Array Signal Processing Research," IEEE Signal Processing Magazine, Jul. 1996, pp. 67-94.

Marchand, P. and J-L Locoume, "Multiple Hypothesis Modulation Classification Based on Cyclic Cumulants of Different Orders," 0-7803-4428-6/98 IEEE, pp. 2157-2160.

Nikias, C.L. and J.M. Mendel, "Signal Processing with Higher-Order Spectra," IEEE Signal Processing Magazine, vol. 10, No. 3, Jul. 1993, pp. 10-37.

Roy, R., A. Paulraj, T. Kailath, "Direction-of-Arrival Estimation by Subspace Rotation Methods," Proc. ICASSP86, pp. 2495-2498.

Schmidt, R.O., "Multiple Emitter Location and Signal Parameter Estimation," IEEE Transactions on Antennas and Propagation, vol. AP-34, No. 3, Mar. 1986, pp. 276-280.

Swami, A. and B.M. Sadler, "Hierarchical Digital Modulation Classification Using Cumulants," IEEE Transactions on Communications, vol. 48, No. 3, Mar. 2000, pp. 416-429.

Tong, L., G. Xu, and T. Kailath, "Blind Identification and Equalization Based on Second-Order Statistics: A Time-Domain Approach," IEEE Transactions on Information Theory, vol 40, No. 2, Mar. 1994, pp. 340-349.

Van Veen, B.D. and K.M. Buckley, "Beamforming: A Versatile Approach to Spatial Filtering," IEEE ASSP Magazine, Apr. 1988, pp. 4-24.

* cited by examiner

METHOD AND SYSTEM FOR TRACKING EIGENVALUES OF MATRIX PENCILS FOR SIGNAL ENUMERATION

RELATED APPLICATIONS

The present application is related to and co-pending with commonly-assigned U.S. patent application Ser. No. 10/360,631 entitled "Blind Source Separation Utilizing A Spatial Fourth Order Cumulant Matrix Pencil", filed on 10 Feb. 2003, the disclosure of which is hereby incorporated herein by reference.

The present application is related to and co-pending with U.S. patent application Ser. No. 10/400,486 entitled "Method and System for Waveform Independent Covert Communications", filed 28 Mar. 2003 the entirety of which is hereby incorporated herein by reference.

The present application is related to and claims benefit of U.S. Provisional Patent Application Ser. No. 60/458,038 entitled "Cooperative SIGINT for Covert Communication and Location Provisional", filed 28 Mar. 2003, the entirety of which is hereby incorporated herein by reference.

The present application is related to and filed concurrently with U.S. patent application Ser. No. 10/739,021 entitled "System and Method for Waveform Classification and Characterization Using Multidimensional Higher-Order Statistics", filed 19 Dec. 2003 the entirety of which is hereby incorporated herein by reference.

GOVERNMENT LICENSE RIGHTS

The U.S. government has a paid-up license in this invention and the right in limited circumstances to require the patent owner to license others on reasonable terms as provided for by the terms of Contract No. NRO000-02-C-0389 awarded by the National Reconnaissance Office.

BACKGROUND

In the advent of globalization, information is a fundamental and valuable commodity. Information and intelligence regarding national defense and security comes at an even higher premium.

Intentional detection of a signal or message can be accomplished in military systems that use specially designed electronic support measures ("ESM") receivers. These ESM receivers are often found in signal intelligence ("SIGINT") applications. In commercial applications, devices employed by service providers (e.g., spectral monitors, error rate testers, etc.) can be used to detect intrusion on their spectral allocation.

Interception is the measurement of waveform features or parameters useful for classifying/identifying a transmitter and/or the waveform type and/or deriving information useful for denying (e.g., jamming) the communication. Exploitation is processing a signal by an unintended receiver in an attempt to locate the transmitter and/or recover the message content. In the broad literature on covert communications these characteristics as applied to transmitted information signals are referred to as low probability of detection ("LPD"), low probability of intercept ("LPI"), and/or low probability of exploitation ("LPE") by an unintended receiver.

As is known to those of skill in the art, for an unintended receiver the signal detection process is typically based on an energy threshold. The energy the receiver measures is given by $E_{tot}=P_{avg}T_{xmit}$. Where under general conditions the power $P_{avg}$ is the received covert signal power S plus internal receiver noise power N. Hence, $E_{tot}=(S+N)T_{xmit}$. If the signal power used to communicate is only a small fraction of the receiver noise, S<<N, it is extremely difficult for the unintended receiver to reliably detect the presence of the covert signal because the total energy detected will only be marginally greater than the noise-only (S=0) case.

Blind Source Separation ("BSS") algorithms are often used, as the name implies, to separate the sources of signals. This can be important for SIGINT and other applications. An important aspect helpful to BSS is determining the number of signals present, known as "signal enumeration". Signal enumeration also requires detection of signals apart from received noise, whether that noise be white or colored. Such detection and discrimination is made significantly more difficult when low energy signals are used as described above, because the receiver receives the transmitted waveforms along with environmental and random noise. Generally, the noise is white Gaussian noise, color noise, or other interferer signals. Prior art detection and enumeration systems and methods have been inadequate due, in part, to the reception of target signals along with environmental and random noise and the inability of the prior art detection and enumeration systems and methods to distinguish the target signal from the noise.

Embodiments of the present inventive system and method address the above needs while requiring only an extremely low power signal.

DETAILED DESCRIPTION

Figure 1:
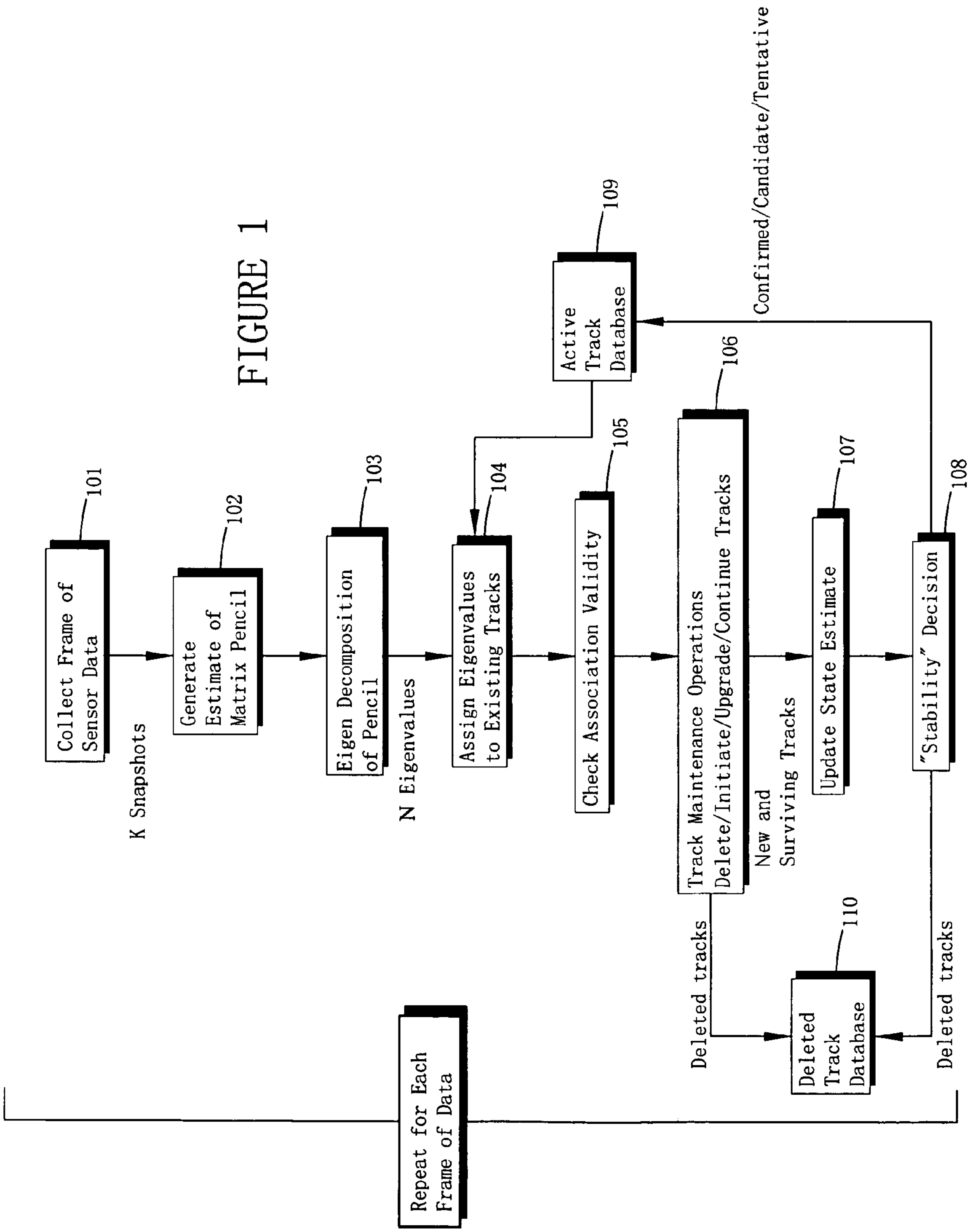
FIG. 1 is a flow diagram for detecting and enumerating signals using eigenvalue correlation according to an embodiment of the disclosed subject matter.

The method and System for signal enumeration described herein is possible because of the uniqueness of a received signal's higher order statistics, specifically higher order statistics that include $2^{nd}$ order spatial correlations and $4^{th}$ order spatial cumulants and the stability over time of associated eigenvalues in the complex plane (i.e. the plane with real and imaginary axes).

Spatial high order statistics can be used to separate signal sources and noise, such as in a blind source separation algorithm that utilizes a normalized spatial fourth-order cumulant matrix pencil and its generalized eigenvalue decomposition ("GEVD"). Central to this approach is that a high order statistic, specifically, but not limited to, the $4^{th}$-order characteristic of a transmitted signal, is recoverable with a spatial fourth-order cumulant matrix pencil ("SFOCMP").

The equations presented herein use the following subscripting convention. Quantities relating to the array observations available to the system are denoted with a boldface subscript x. However, the subscript should not be confused with the representation of the vector observation from the array output, also denoted as a boldface x. From the context the meanings shall be clear to those of skill in the art. Further, quantities relating to the propagating signals impinging on a receive array are denoted with a boldface subscript r. Following this convention, the matrix pencil of the array output data is given as in equation 1. An assumption is made that the received signals r comprising the vector observation of the array output x are independent. Therefore the spatial fourth-order cumulant matrix pencil ("SFO-CMP") of the array output $P_x$ can be written as:

$$P_x(\lambda,\tau)=C_x^4(0,0,0)-\lambda C_x^4(\tau_1,\tau_2,\tau_3) \quad (1)$$

where the arguments of the pencil $P_x$ represent a generalized eigenvalue, λ, and a triplet of time delays, τ. The theoretical set of finite generalized eigenvalues turns out to be the inverse of the normalized fourth-order autocumulants of the M signals, $\{r_i(t)\}_{i=1}^M$ in the field of view (FOV) during the observation interval. The terms $C_x^4$ represent the spatial fourth-order autocumulant matrices. The arguments of the terms indicate the triplet of time delays used to form the matrices. The explicit computation is given as $$[C_x^4(\tau_1,\tau_2,\tau_3)]_{rc} \equiv \sum_{i=1}^{N} Cum[x_i^*(t-\tau_1), x_i(t-\tau_2), x_r(t), x_c^*(t-\tau_3)]$$

where the matrix is N×N, and the subscript rc indicates the element in the $r^{th}$ row and the $c^{th}$ column. The subscript i on the function x in the argument on the right-hand side is summed over the array output ports, i=1, 2 . . . ,N, where N is the number of sensor array ports, or, equivalently, the spatial degrees of freedom in the array.

Because of the unique definition of the pencil of the array output data, $P_x$ is related to the pencil of the impinging, (i.e., received) signals $P_r$ as given in equation 2:

$$\begin{aligned} P_x(\lambda,\tau) &= C_x^4(0,0,0)-\lambda C_x^4(\tau_1,\tau_2,\tau_3) \\ &= V[C_r^4(0,0,0)-\lambda C_r^4(\tau_1,\tau_2,\tau_3)]V^H \\ &= VP_r(\lambda,\tau)V^H \end{aligned} \quad (2)$$

The quantity V shown in equation 2 is a N×$M_s$ matrix composed of the steering vectors for each signal impinging on the array, where N is the number of array ports available to the user and $M_s$, $M_s \leqq N$, is the number of signals. In a very simplistic and idealized case the well-known array propagation vector is a steering vector (i.e., the time delay is represented as phase). In general, if the array is well-designed (i.e., no grating lobes) and the signals are emitted from non-identical locations, then the matrix V is of full rank. This guarantees an equivalence between the eigen structure of the pencils $P_r$ and $P_x$.

Since $P_r$ is a pencil solely of the received signals, and the signals are assumed independent, then by virtue of the properties of cumulants, the pencil $P_r$ is diagonal. This property does not hold true for the pencil formed with the array output data x. However, because of "equivalence" finite eigenvalues of $P_x$ are the finite eigenvalues of $P_r$, access to an exploitable high-order statistical property, the eigenstructure of the SFOCMP, is available. As introduced here these eigenvalues represent the fourth-order characteristics of each received signal. Specifically, each signal in $\{r^i(t)\}_{i=1}^M$ contributes one finite eigenvalue, and it is expressed as the inverse normalized fourth-order autocumulant for that signal as expressed by equation 3.

$$\lambda_m = \frac{c_{r_m}^4(0,0,0)}{c_{r_m}^4(\tau_1,\tau_2,\tau_3)} \text{ for } m=1,2,\ldots,M \quad (3)$$

where the terms $C_{r_m}^4$ represent the individual fourth-order cumulant terms for each signal. These terms are actually the diagonal terms of the pencil $P_r$ as shown in equation (4).

$$P_r(\lambda,\tau) = \begin{bmatrix} c_{r_1}^4(0,0,0)-\lambda c_{r_1}^4(\tau_1,\tau_2,\tau_3) & 0 & \cdots & \cdots & 0 \\ 0 & \ddots & & & \vdots \\ \vdots & & c_{r_j}^4(0,0,0)-\lambda c_{r_j}^4(\tau_1,\tau_2,\tau_3) & & \\ \vdots & & & \ddots & \vdots \\ 0 & \cdots & \cdots & & c_{r_M}^4(0,0,0)-\lambda c_{r_M}^4(\tau_1,\tau_2,\tau_3) \end{bmatrix} \quad (4)$$

Thus the GEVD of the two pencils $P_x$ and $P_r$ have the same set of finite solutions for the eigenvalues. The eigenvalues are the terms where the rank of the pencil is reduced. It should be readily apparent to those of skill in the art that values given by equation (3) are the eigenvalues of the pencil equation (1).

These eigenvalues are available to an analysis system, and in theory are independent of system Gaussian noise level given sufficient length data records. The eigenvalues are implicit characteristics of the signals carrying the emitter's covert message in each symbol duration. To exploit this property, as mentioned before, the receiver will typically form blocks or batches of received data for the purpose of correlating the eigenstructure over time to determine the presence of signals. It is important to note that only the persistence of the emitter's signal statistical characteristic as measured by the SFOCMP is relevant, and not the exact values.

Embodiments of the disclosed subject matter use these unique relationships described above to detect and enumerate signals in a multi-signal and noise environment by tracking the stability of eigenvalues in the complex plane over a time duration. Additionally, signals of interest may be pulsed, so it is advantageous to be able to determine when signals of interest are present as well as how many signals are present. The present disclosed subject matter describes embodiments that can accomplish both goals. The discrimination of a signal from other signals is determined by location on the complex plane whereas discrimination of signals from noise is effectuated on the complex plane by the change in location of the eigenvalues over time. Furthermore, unlike the prior art, the embodiments of the present disclosed subject matter do not require any of the assumptions of analytical descriptions of the signals or the noise in order to accomplish the above-stated goals.

FIG. 1 is a flow chart of a method for detecting and enumerating signals according to an embodiment of the disclosed subject matter. A frame or block of sensor data is collected from an N-port array sensor in block 101, the block comprises k snapshots. From the sensor data, an estimate of the matrix pencil is generated using a spatial high-order statistic, shown in block 102. A Generalized eigenvalue decomposition of the matrix pencil is performed resulting in N eigenvalues in block 103. These eigenvalues are then assigned to existing tracks of eigenvalues on a complex plane and each assigned eigenvalue is give a state designation, as discussed further below, in block 104. An assignment of a eigenvalue to a track is loosely termed a "hit". The existing tracks are continually generated from past and present iterations of these process-based hits.

The association of the eigenvalue assignments are checked for validity based upon a variety of defined criteria in block 105. One such criteria is that the track must form outside a specific circular region centered on the origin of the complex plane. This criteria is not necessary, but may provide a useful means of rejecting uninteresting data, since the signal eigenvalues as defined above in equation (3) should always be greater than unity.

Track maintenance operations are performed in block 106 including deletion of an existing track, initiation of a new track, upgrade of an existing track, continuation of an existing track, all of which are done on a block by block basis. The tracks may have many state levels, however for illustrative purposes only, four states are used in the disclosed embodiment. These states are new, tentative, candidate and confirmed. Of course, deleted tracks are not considered to be in a state. The state estimates of the tracks are then updated in block 107 and a stability decision is made in block 108 in which the active tracks and their respective states are stored in the active track database as shown in block 109. The deleted tracks are stored as shown in block 110. Blocks 101–110 are repeated as necessary, consistent with the above explanation, for each block or frame of data.

An important function of a tracker is the track initiation and deletion logic. An embodiment of the tracks uses a fixed distance and a fixed number of consecutive "good associations" for initiation and a single "no association" for a track deletion. A "good association" is any measurement that is "close enough" to track. A "no association" condition occurs when all the measurements are "too far" from a particular track. The distance indicative of a good association may be set empirically or experimentally. The variance of successive eigenvalues belonging to the same track can be effected by block size (e.g., number of snapshots) and this must be considered when selecting the threshold to delete (i.e., "break") a track. The block size controls the severity of eigenvalue motion in the complex plane. Testing to date has shown that blocks of 5,000 snapshots (at 0 dB received SNR) are about the minimum that can be used for the eigenvalue correlator (tracker). However, the sizing for the block processing (i.e., the block of contiguous array observations, sometimes known as "snapshots") is also dependent on several factors such as mixing matrix rank, signal types, SNRs and SNIRs. For pulsed signal sources, smaller blocks are preferred so that the time history of the pulsed signal can be accurately captured.

Track initiation and track deletion strategies can also be used to adapt to various situations. One approach uses a Kalman-like estimator to adapt the association gates as the number of observations for a track are accumulated. Such an approach also has the advantage of replacing fixed averaging of the measurements. Additionally a measurement-to-track assignment model may be based on greedy nearest-neighbor implementation with a Euclidean distance cost metric, wherein all feasible assignments (e.g., 1-1 correspondence of j of N eigenvalues to j tracks in each block) along with the individual cost (e.g., Euclidean distance) of each measurement-to-track assignment are generated. Still other approaches may be implemented using maximum likelihood or multiple hypothesis approaches. As is apparent to those of skill in the art, other assignment models may be used and are contemplated by the present disclosure.

As mentioned above, the tracks are established, states updated, deleted or continued on the basis of assigned eigenvalues. The first appearance of an unassigned eigenvalue establishes a new track and the track state assigned is the "new" state. Subsequent appearance of another eigenvalue in a successive block assignable to the new track will update the estimate of the "true" eigenvalue and update the track state to the "tentative" state. Further assignments to the track will upgrade the track state to the "candidate" state and then to the "confirmed" state. Once the state of a track is upgraded to the "confirmed" state, an embodiment of the inventive process may indicate detection of a signal and may the newly-detected signal may be used in the signal enumeration process. However, it should be obvious to those of skill in the art that not all applications of the presently-disclosed procedure would require or benefit from four track states and that other strategies using a different number of track states are derived readily from the above-described approach and are contemplated by the present disclosure. In the event that a track does not have a later-assignable eigenvalue, the track correspondingly will be downgraded or deleted. Various different parameters and strategies for upgrading, downgrading or deleting tracks are envisioned in the presently-disclosed process and would be obvious to those of skill in the art.

Figure 2:
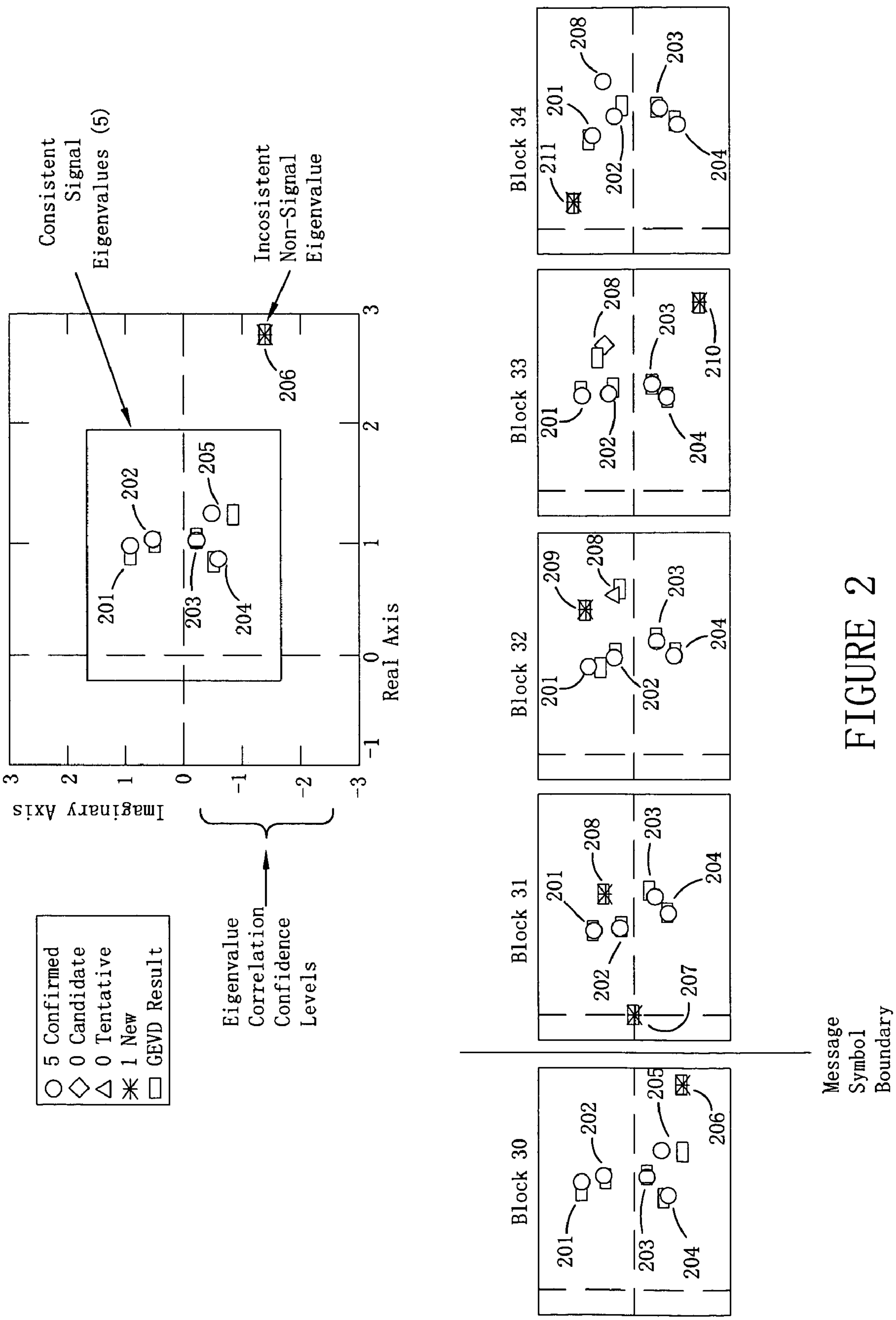
FIG. 2 is a representation of Block-to-Block Eigenvalue correlation according to an embodiment of the disclosed subject matter for M=5 signals and N=6 output ports of the array.

FIG. 2 is a representation of sequential eigenvalue locations in the complex plane for an N sensor array with $M \leqq N$ signals. In the example illustrated with respect to FIG. 2, M=5 signals and N=6 output ports for the array. FIG. 2 illustrates a portion of the block-to-block eigenvalue mapping from the process of FIG. 1. For block 30, the large complex plane diagram in the top portion of the FIG. 2 shows the complex eigenvalue locations (shown as rectangles) of the SFOCMP (GEVD) results and the predicted locations of the block-wise eigenvalue correlator. The legend identifies the four levels of eigenvalue correlation confidence, ("New", "Tentative", "Candidate", and "Confirmed") used in the present example. The five consistent signal eigenvalues of five steady signals are indicated by the smaller box. The legend indicates all of the five consistent signals are on tracks that have been confirmed and thus the output of the enumeration process of FIG. 1 would be 5 confirmed tracks at the indicated time index. The inconsistent non-signal eigenvalue outside this box tends to move about the complex plane in an erratic/unstable fashion from one block to the next. This is due to the estimation of a 0/0 or indeterminate eigenvalue arising because there are only M=5 signals impinging on the N=6 port array for this example. The inconsistent non-signal eigenvalue's track state is shown as "new". As will be appreciated by those of skill in the art, the non-signal eigenvalue's track state will usually be "new" since only rarely will the eigenvalue of a non-signal be consistent from block to block. Since there are N=6 output ports for the array, there will generally be six eigenvalues determined for each block and mapped on the complex plane.

The lower portion of FIG. 2 illustrates the block-wise changes in eigenvalue locations over blocks 30 to 34. Stepping through the GEVD results, the tracks, and the state of the tracks through each of the successive blocks 30 to 34 in FIG. 2 is useful for obtaining a fundamental understanding of this disclosure. Blocks 30 and 31–34 correspond to two different symbols as shown by the message symbol boundary between blocks 30 and 31. In block 30 there are 5 confirmed tracks, 201, 202, 203, 204 and 205 and one new track 206. In block 31, confirmed tracks 201–204 have eigenvalues (GEVD results—shown as rectangles in FIG. 2) assigned to them based on the assignment policy selected for the application for which the inventive process is used. However, track 205 no longer has an associated eigenvalue and, in this case, the track is deleted because of a single "miss". Alternatively, a "coast" option could be implemented so as to preserve confirmed track 205 for a predetermined number of blocks to ensure its disappearance was not an anomaly. Track 206 also does not have an assignable eigenvalue in block 31, thus track 206, having a state of only new in block 30, is deleted. Two new eigenvalues have appeared in block 31: one at the origin, new track 207; and another designated new track 208. In block 32, eigenvalues assignable to confirmed tracks 201–204 again appear, as does an eigenvalue assignable to track 208, which is now upgraded from a "new" track to a "tentative" track. New track 207 in block 31 is without an assignable eigenvalue in block 32 and is therefore deleted. A new eigenvalue appears in block 32 and is designated new track 209. Since the eigenvalue shown with respect to reference numeral 209 is "far" from the eigenvalue shown with respect to reference numeral 207 in block 31, the eigenvalue 209 is not associated with the eigenvalue 207. Hence, eigenvalue (and "new" track) 207 is deleted and a "new" track is started with the eigenvalue 209. As will be recalled, in block 31 "new" track 208 was designated. As seen in block 32, another eigenvalue appears in close proximity to the location of the eigenvalue (also designated a "new" track) 208 in block 31 and therefore the eigenvalue in block 32 is associated with the eigenvalue 208 in block 31, thereby upgrading the "new" track 208 to a "tentative" track 208. In block 33, "tentative" track 208 has a third consecutive assignable eigenvalue and is accordingly upgraded to a "candidate" track 208. Track 209 in block 32 does not have an assignable eigenvalue in block 33 and is therefore deleted, again using the single "miss" policy used in this example. Additionally in block 33, a new eigenvalue 210 appears which is not assignable to any existing track. Therefore, eigenvalue 210 is designated "new" track 210. In block 34, an eigenvalue is assignable to "candidate" track 208 thereby causing track 208 to be upgraded to a "confirmed" track 208. Additionally in block 34, a new eigenvalue 211 appears which is not assignable to any existing track. Therefore, eigenvalue 211 is designated "new" track 211. As can be seen in blocks 30–34, an assignable eigenvalue appears for each of tracks 201, 202, 203, and 204 maintaining these tracks as "confirmed" tracks. With reference to block 34, there appear five "confirmed" tracks, designated 201, 202, 203, 204, and 208 and therefore there are five enumerated signals in block 34.

Figure 3:
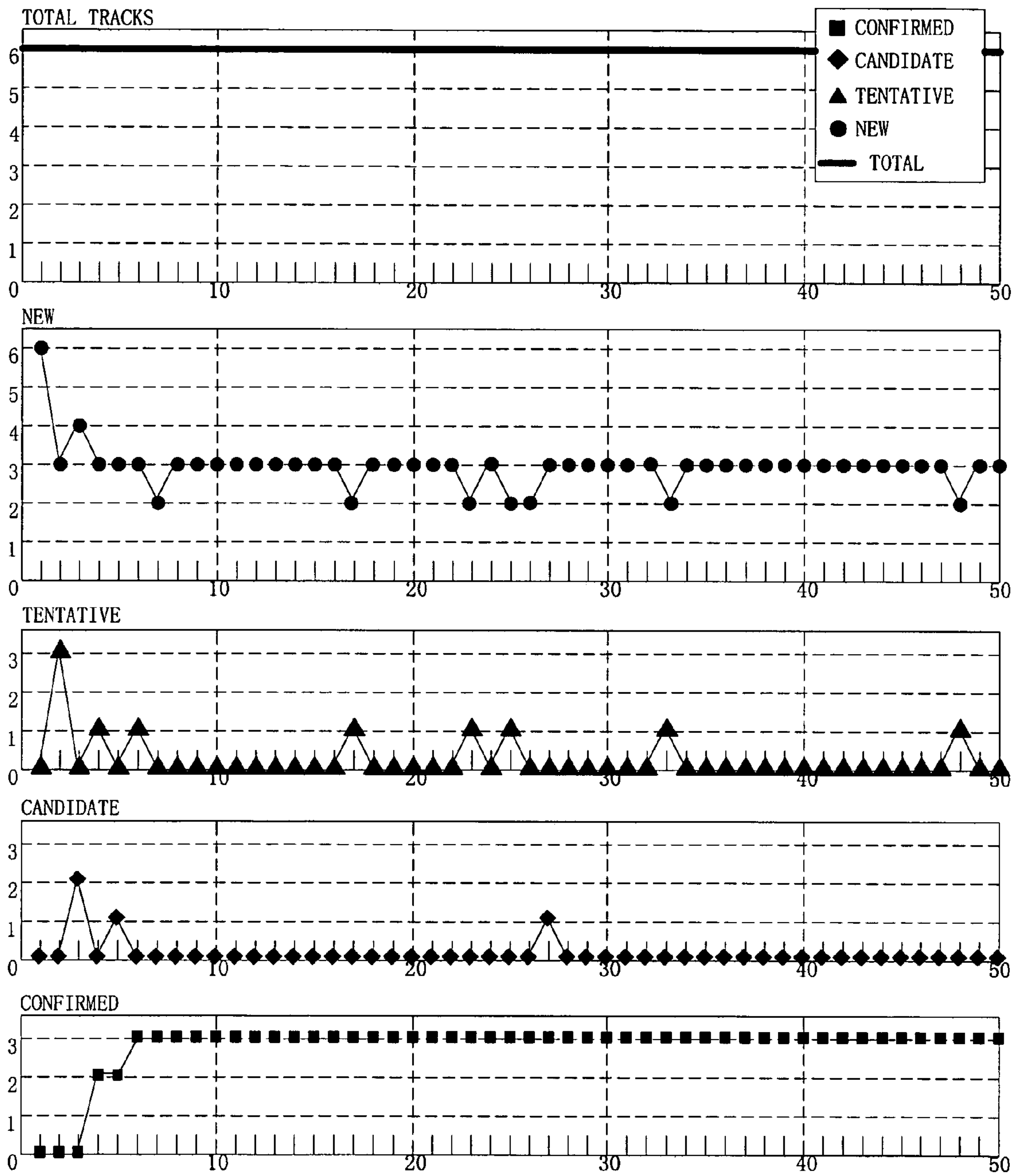
FIG. 3 is a representation of a simulation run with a six sensor eigenvalue correlator tracking three signals.

FIG. 3 illustrates an example of the block-wise tracking of three changing signals with six sensors. This figure illustrates a simulation scenario where three nearly identical Gaussian Minimum Shift Keying ("GMSK") signals were sensed by a six element array with one output port per element. At each time instant there should always be six tracks, and in steady-state conditions, as shown in FIG. 3, three of the six tracks are designated "new" and the other three tracks are designated "confirmed". Occasionally, as shown in FIG. 3, a "tentative" track begins to form which causes a drop in the number of "new" tracks (i.e., one of the "new" tracks has a subsequently-associated eigenvalue thereby causing an upgrade in the state of the track from "new" to "tentative"). As is obvious to those of skill in the art, the upgrade of a track from "new" to "tentative" will not affect the number of "confirmed" tracks, which remains constant at three. Rarely does a sequence of non-signal eigenvalues associate well enough to produce a "candidate" track. As will be appreciated by those of skill in the art, each time a non-signal track has attempted to form, the track has been rejected because the number of associations required to attain "confirmed" status was not reached. While the rejection of false tracks (i.e., non-signal tracks) is one advantage of using a multiple-state progression for a track, the use of multiple-state progressions for a track delays confirmation of a signal. Therefore, it is recognized and contemplated by the present disclosure, that track confirmation policies must be balanced with initiation time constraints. Likewise, similar trade-offs must be balanced for track deletion policies.

Figure 4:
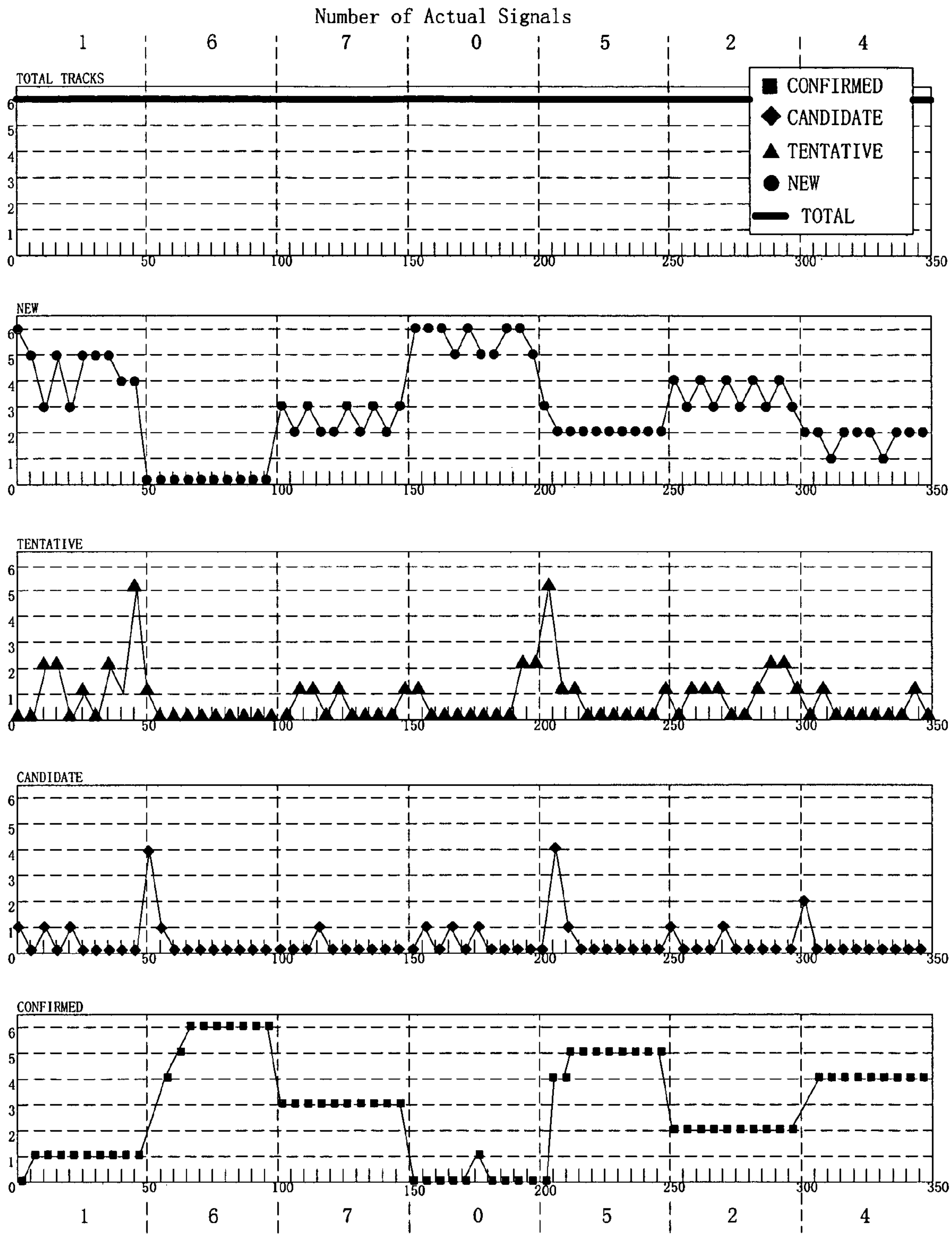
FIG. 4 is a representation of a six sensor eigenvalue correlator tracking between zero and six signals.

FIG. 4 illustrates a more complex simulation scenario where the number of active signals is cycled through M=1, 6, 3, 0, 5, 2, 4 signals in 50 block increments. This example illustrates the block-wise tracking of a variable number of changing signals with six sensors. As seen in FIG. 4, the tracker of the present disclosure quickly adapts to the changing signal environment and provides a correct estimation of the number of signals. The total number of tracks in FIG. 4 is six. The number of "new" tracks at each block is indicated by the black circle trace. As can be seen in FIG. 4, from time to time anomalies occur which cause some non-signal tracks to upgrade from the "new" state to the "tentative" state or the "candidate" state. Furthermore, it will be noted that in FIG. 4 there is one instance, at block 175, where a signal was declared when none should have been (i.e., a false alarm). However, the signal was quickly rejected as the track failed to maintain "confirmed" status.

Figure 5:
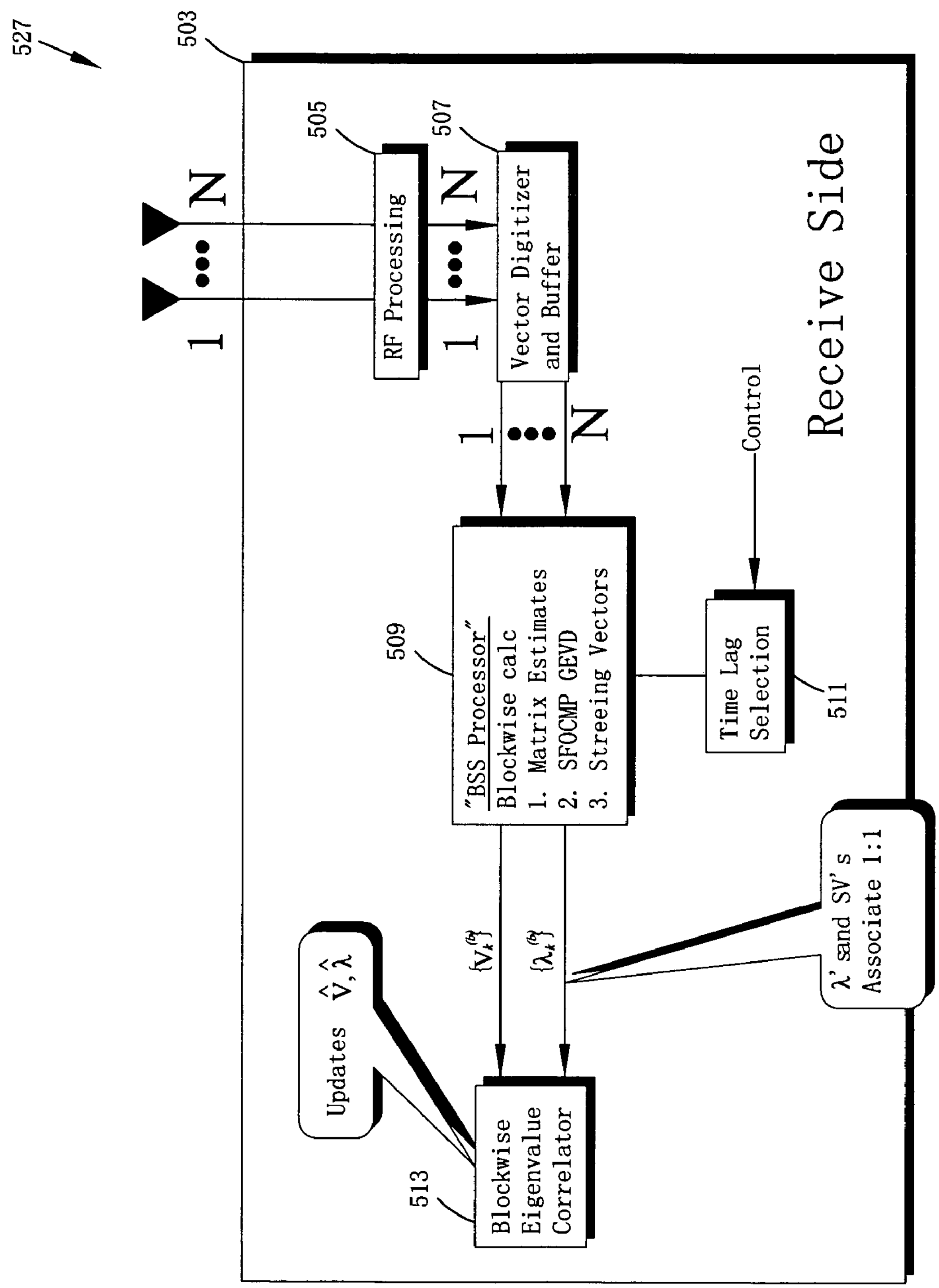
FIG. 5 is a representation of an embodiment of a signal detection and enumeration system.

FIG. 5 is an embodiment of a system for detecting and enumerating signals in a multi-signal and noise environment. Generally, the Blind Source Separation processor 509 forms and applies a separation Matrix and enumerates the number of sources. As described above, from an array output the spatial $4^{th}$ order cumulant matrices are estimated and the estimates are used to determine the eigen analysis for the first-order matrix pencil. Signal detection and enumeration providing the number of sources is performed and the separation matrix from the pencil eigenvectors is accomplished. Since this exemplary technique is independent of the particular eigenvalue, it is independent of the waveforms used by the emitter, thus any proper (i.e., $M \leqq N$) mixture of BPSK, QPSK, GMSK, QAM, DBPSK MFSK, FSK, DQPSK, AM and FM signals, for example, can be detected and enumerated.

The receiver 503 uses an N-element (or port) receive array 527 and an RF processor 505 to receive the transmitted signal. In order to capture the temporal character (i.e., the time duration modulation of the SFOCMP eigenvalues) of the transmitted signal, the array data is first sampled and digitized at some rate suitable for the application. The sampling and digitization can be effected by known A/D converters, processor, or other logic circuitry and can be implemented by hardware, software or a combination thereof. Each array output is digitized substantially simultaneously thereby producing a vector observation in the vector digitizer and buffer 507. The array output data is buffered and subdivided into non-overlapping blocks in 507. Those skilled in the art will recognize that overlapping blocks may be used in some instances and are not excluded from consideration, but may require additional processing depending on the degree of overlap. The vector observations are then collected from an array, block-wise across signal samples, at the intended receiver aperture. The cumulants are block estimated, the matrix pencil is formed, and the generalized eigenvalue decomposition (GEVD) is performed by the Blind Source Separation processor 509.

The operation of the BSS requires the selection of a triplicate of time lags provided by the time lags selection device 511. The GEVD provides a set of N eigenvalues $\lambda_k^{(b)}$ and N eigenvectors $V_k^{(b)}$, where k=1, 2, 3, . . . , N (assuming an N-port array is used) for each block of data. The superscript b is used as a block counter in the receiver. It is assumed that there are $M_s$ generalized eigenvalues representing the SFOCMP properties for each of the $M_s$ signals in the field of view (FOV) of the receive array 527, where $M_s \leqq N$. The remaining $N-M_s$ eigenvalues are of the indeterminate type (i.e., 0/0 type). Thus when using a sequence of block estimates for the SFOCMP eigenvalues of the $M_s$, consistent signals will be apparent as discussed above.

As may be apparent to those of skill in the art, there may be some advantage to overlapping blocks of the data. However, the following discussion deals with non-overlapping blocks but it shall be understood that the disclosure is not so limited. On each block, the two $4^{th}$-order spatial cumulant matrices required to form the SFOCMP are formed using pre-selected delay triplets. The delays can be either pre-selected or subjected to online modification. As a non-limiting example, the delays may be determined using a programmed search routine.

After the matrix pencil is formed, the GEVD is computed. From the GEVD, the eigenvalues and eigenvectors are used to determine the signal environment over time block b. Subsequently, the eigenvectors are used to determine the signal steering vectors and then the eigenstructure is correlated block-wise in the Blockwise Eigenvalue Correlator 513 to determine any changes in the signal environment. A change, such as symbol boundary, in the number of received signals will alter signal environment eigenstructure, measured by the SFOCMP, in a detectable manner. This translates into a "significant" movement in the complex plane of eigenvalues. As signal changes are detected, those signals are cued for storage in the signal history database 517. The eigenvalues no longer correlating with the present signal structure are also written to the database. The temporal support (i.e., duration) of the eigenvalues no longer correlating with the current signal structure is measured and stored. All this data may be formed and recorded in the signal history database 517 along with other ancillary data that may be useful for signal post-processing applications such as data mining or covert message recovery.

Consider the case where multiple remote covert emitters are sending data. It is unlikely that separate emitters (covert or otherwise) would have exactly the same fourth-order cumulant representation, even if they are using the same base waveform. This is because any deviation from nominal waveform implementation (e.g., frequency change, waveform change, matrix pencil eigenvalue change, phase noise, I/Q imbalance, timing jitter, phase jitter, symbol rate change, pulse shape change, a fourth-order statistic change, relative rotational alignment of a signal constellation change, power amplifier rise/fall time change, and Doppler shift change) causes the $4^{th}$-order statistics of these signals to differ.

As mentioned above, using a simple time-gating operation in the receiver makes it possible to determine which eigenvalues represent potential signals of interest. By correlating the GEVD over successive blocks of data, the persistence of the eigenvalues can be measured. The persistence of eigenvalues of the SFOCMP over time is the indication the eigenvalue most likely represents a signal of interest and not noise.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

We claim:

1. In a method for signal enumeration for performing blind source separation of plural signals in a multi-signal environment, the improvement comprising the step of tracking eigenvalues of matrix pencils over successive frames where at least one of the matrix pencils is a function of one of said plural signals to thereby enumerate the signals.

2. In a method for signal enumeration for performing blind source separation of plural signals in a multi-signal environment, the improvement comprising the step of tracking eigenvalues of matrix pencils where at least one of the matrix pencils is a function of one of said plural signals:

collecting frames of data from the plural signals;

providing an estimate of at least one matrix pencil from one of the frames;

deriving an eigenvalue from one of the matrix pencil estimates;

associating the eigenvalue by either assigning the eigenvalue to an existing track of eigenvalues plotted on a complex plane or assigning the eigenvalue to a new track on the complex plane as a function of a set of predetermined criteria;

performing eigenvalue track maintenance operations; and, updating signal enumeration estimates.

3. The method of claim 2 wherein the step of providing an estimate of at least one matrix pencil comprises the step of determining a higher order statistic.

4. The method of claim 3 wherein the higher order statistic is a $2^{nd}$ order moment.

5. The method of claim 3 wherein the higher order statistic is a spatial $4^{th}$ order cumulant.

6. The method of claim 2 wherein the step of performing track maintenance operations comprises at least one of the steps selected from the group consisting of initiating a new track, deleting a track, upgrading a track, or continuing a track.

7. The method of claim 6 wherein the step of performing track maintenance operations is performed on each track based on eigenvalue assignments.

8. The method of claim 6 wherein the step of initiating a new track comprises the step of creating a new track associated with an unmatched eigenvalue.

9. The method of claim 6 wherein the step of deleting a track is performed when said track is not assigned an eigenvalue for a predetermined number of frames of data.

10. The method of claim 9 wherein the predetermined number is greater than one.

11. The method of claim 6 wherein the step of upgrading a track is performed when a track is assigned an eigenvalue from the frame of data.

12. The method of claim 6 wherein the step of continuing a track is performed when a confirmed track is not assigned an eigenvalue from the frame of data.

13. The method of claim 2 wherein the step of deriving an eigenvalue comprises the step of performing eigenvalue decomposition of a matrix pencil.

14. The method of claim 2 wherein the frame comprises a plurality of signal snapshots from a plurality of sensor elements.

15. The method of claim 14 wherein the plurality of signal snapshots is less than 5000.

16. The method of claim 2 wherein ones of successive frames are overlapping.

17. The method of claim 2 further comprising the step of checking track association validity.

18. In a method of blind source separation of plural signals in a multi-signal environment in which the number of signals is unknown, the improvement comprising the step of determining the number of unknown signals as a function of block-wise tracking over successive blocks of eigenvalues derived from the plural signals.

19. The method of claim 18 wherein the multi-signal environment includes noise.

20. The method of claim 19 wherein the step of tracking eigenvalues is accomplished independent of the type of waveform of the plural signals.

21. The method of claim 19 wherein the step of tracking eigenvalues is accomplished independent of the character of the noise.

22. A method of estimating M number of signals received as a composite signal by an N element array independent of any parameters of the M signals, where M≦N comprising the steps of:

(a) collecting plural frames of data at predetermined time intervals from the N element array;

(b) deriving a plurality of eigenvalues from a frame of data;

(c) associating each eigenvalue by either assigning the eigenvalue to an existing track of eigenvalues plotted on a complex plane or assigning the eigenvalue to a new track on the complex plane as a function of a set of predetermined criteria;

(d) adjusting a state of the eigenvalue tracks; and, (e) determining an estimate for M as a function of the number of eigenvalue tracks mat least one predetermined state.

23. The method of claim 22 comprising the step of repeating steps (b) through (e) for successive frames of data.

24. The method of claim 22 wherein the state of an eigenvalue track is selected from the group consisting of new, tentative, candidate, and confirmed.

25. The method of claim 22 further comprising the step of deleting an existing track of eigenvalues when said track is not assigned an eigenvalue for a predetermined number of frames of data.

26. The method of claim 25 wherein the predetermined number of frames of data is greater than one.

27. The method of claim 22 wherein the step of assigning an eigenvalue to an existing track is a function of the Euclidean distance between said eigenvalue and said existing track.

28. In a method for signal enumeration for blind source separation of plural signals in a multi-signal environment including noise, the improvement comprising the step of mapping eigenvalues of matrix pencils in a complex plane over successive frames where at least one of the matrix pencils is a function of one of the plural signals to thereby enumerate the plural signals.

29. In a method for determining the number of signals in a multi-signal environment with noise, the improvement of distinguishing a first one of the plural signals from the others of the plural signals and from the noise as a function of the frame to frame stability of a series of eigenvalues in a complex plane that are derived from a characteristic of the first signal over a predetermined number of time intervals.

30. A system for signal enumeration in a multi-signal environment, comprising:

means for collecting frames of data from the plural signals;

means for providing an estimate of at least one matrix pencil from one of the frames;

means for deriving an eigenvalue from one of the matrix pencil estimates;

means for associating the eigenvalue by either assigning the eigenvalue to an existing track of eigenvalues plotted on a complex plane or assigning the eigenvalue to a new track on the complex plane as a function of a set of predetermined criteria;

means for performing eigenvalue track maintenance operations; and, means for updating signal enumeration estimates.

31. In a system for signal detection and enumeration having a multi-element array, a receiver and an eigenvalue generator, the improvement comprising:

an eigenvalue location processor for block-wise mapping of eigenvalues on a complex plane; and, a counter for recording a predetermined number of eigenvalues that are mapped in substantially the same location on the complex plane in successive blocks.

32. A method of signal detection comprising the steps of determining a matrix pencil from a high order statistic of digitized sensor data, performing generalized eigenvalue decomposition, and tracking a location of an eigenvalue in a complex plane in successive frames of digital data to thereby detect the signal.

33. A system for detecting a communication signal having a plurality of symbols each formed from a sequence of bits, comprising:

a receiver for receiving and digitizing successive frames of the symbols of said communication signal;

means for determining a matrix pencil eigenvalue for at least one of said symbols for each of a plurality of said frames;

means for determining the generalized eigenvalue decomposition of said matrix pencil eigenvalues;

means for mapping said eigenvalues on a complex plane; and, means for determining the relationship between one eigenvalue in a first frame and a corresponding eigenvalue in a subsequent frame to thereby detect the signal.

34. The system of claim 33 wherein the communication signal is in a multi-signal environment.

35. The system of claim 33 wherein the communication signal is in a noisy environment.

36. The system of claim 33 wherein the means for determining the relationship between eigenvalues comprises determining the Euclidean distance in the complex plane between the eigenvalues.

* * * * *